UNITED STATES PATENT OFFICE.

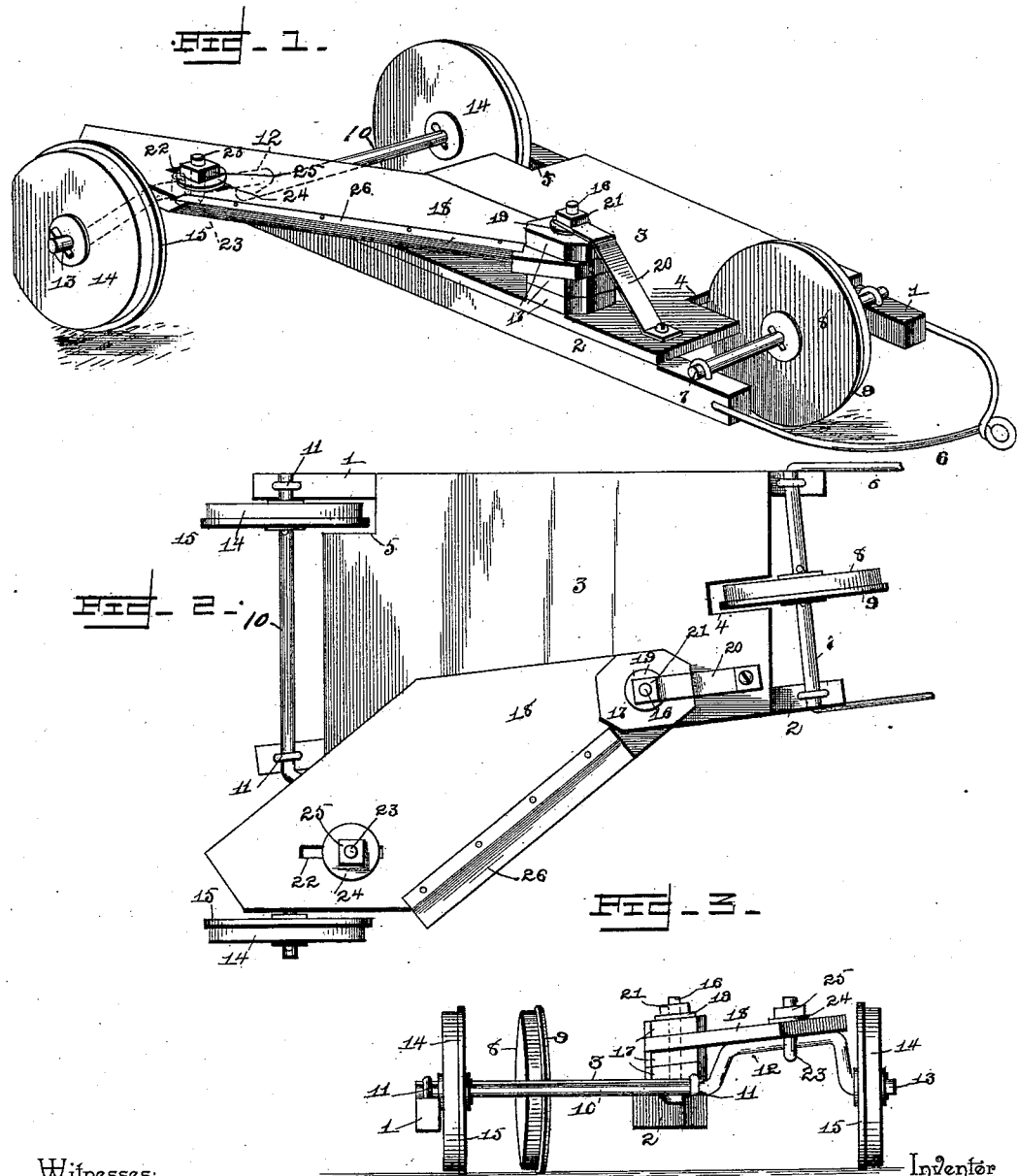

PERRY KESLING, OF LOGANSPORT, INDIANA, ASSIGNOR OF ONE-HALF TO ALEXANDER R. SHROYER, OF SAME PLACE.

CORN-HARVESTER.

SPECIFICATION forming part of Letters Patent No. 469,920, dated March 1, 1892.

Application filed August 8, 1891. Serial No. 402,096. (No model.)

*To all whom it may concern:*

Be it known that I, PERRY KESLING, a citizen of the United States, residing at Logansport, in the county of Cass and State of Indiana, have invented a new and useful Corn-Harvester, of which the following is a specification.

This invention relates to corn-harvesters employed for harvesting standing corn, and has particular reference to that class thereof employing a platform and at one side thereof an inclined knife or blade that is drawn in a shear-like manner across the stalks as the machine moves along.

The objects and advantages of my invention, together with the novel features thereof, will hereinafter appear, and be particularly pointed out in the claims.

Referring to the drawings, Figure 1 is a perspective of a corn-harvester constructed in accordance with my invention. Fig. 2 is a plan. Fig. 3 is a rear end elevation.

Like numerals of reference indicate like parts in all the figures of the drawings.

In constructing the platform of my harvester I employ a pair of side bars 1 and 2, the latter being inclined with relation to the former or converged toward the same from its rear end to its front, so that their rear ends are wider apart than are their front ends. From points near their extremities the two side bars are connected by a suitable platform or flooring 3, which at its front edge, near its center, is provided with a recess 4, inclined with relation to the bar 1 and parallel with the bar 2. At the rear left-hand corner the platform is provided with a recess 5, inclined with relation to the bar 2 and parallel with the bar 1. The front ends of the two bars are connected by a suitable U-shaped bail 6, to which the draft appliances may be attached.

Bolted to the front ends of the bars 1 and 2 is an axle 7, which axle, by reason of the location of its bolts, is at a right angle to the bar 2 and at an oblique angle to bar 1, and upon the center of the axle there is mounted for rotation a wheel 8, which wheel has its periphery provided with a flange 9 at its inner or right-hand edge.

Bolted to the rear extremities of the bars 1 and 2 is the rear axle 10, which axle is disposed at a right angle to the bar 1 and at an oblique angle to the bar 2. The axle at its inner end is extended beyond the bar 2 and is held loosely in position with relation to the bars 1 and 2 by the inverted-U-shaped bolts 11. Beyond the inner or right-hand bar 2 the axle is extended and is bent to form the crank 12 and beyond the crank terminates in a bearing 13. At its outer end or adjacent to the bar 1 opposite the recess 5 and upon the bearing 13 are mounted loosely ground-wheels 14, which ground-wheels have their peripheries provided upon their inner faces or edges with flanges 15. By the location and disposition of this axle 10 it will be seen that the wheels 14 travel parallel to the bar 1 and at an angle to the bar 2.

16 designates a bolt, which passes upwardly to the platform 3 near the right-hand forward corner of the same, and has mounted thereupon a series of blocks or washers 17, and also the inner end of the cutter-bar 18, which blocks and bar are perforated for the reception of the bolt. A washer 19 surmounts the block and bar, as does also the upper end of an inclined brace 20, the lower end of the brace being bolted to the platform, as shown, and the entire structure bound in position by means of a removable nut 21. The upper end of the brace can be removed from the bolt, and such is accomplished by first retrograding the nut 21 therefrom and then withdrawing and swinging the brace to one side. When such is done, the relative position of the washers 17 and the cutter-bar 18 may be changed upon the bolt, and thus the forward end of the cutter-bar raised or lowered and held in any of such positions. The rear end of the cutter-bar is provided with a slot 22, and through the same depends a J-shaped bolt 23, the lower end of said bolt taking under and embracing the cranked portion of the axle, and the upper end of said bolt extending above the bar 18 and having mounted thereon the washer 24 and the nut 25.

It will be readily apparent that by operating the bolt—that is, locating the same at different points along the slot 22—the height of the cutter-bar may be altered—that is, said bar may be raised and lowered—as may also the front end of the bar by means of the space-blocks heretofore described, and in this manner may the knife 26, affixed to the front edge of the bar, be inclined, so as to give a shear-like cut to the stalks, which shear-like cut may be increased or diminished, as desired, by the operator. In harvesters of this class—that is, employing these inclined outwardly-disposed knives or cutters—the constant tendency of the machine is to travel away from the standing stalks, and especially is this so of the rear end of the machine, which is being constantly deflected by the stalks. Various means have been provided and devised for overcoming this tendency, and I herein illustrate one that I have found by practice to be extremely efficient. Such means consist in the described disposition of the wheels relative to the frame-work composing the frame of the platform and also in the inclined side at the inner side of the platform, the whole combining to produce the effect of constantly crowding the rear inner side toward the standing stalks and disposing the front inner side away from the stalks, so that the said stalks come in contact with nothing but the cutting-edge of the knife. It will be understood that the operator stands upon the platform in the usual manner, grasping in his arms the stalks as severed and depositing them to one side, and continuing this until a sufficient quantity has been accumulated from which to produce the desired shock.

Having described my invention, what I claim is—

1. In a corn-harvester, the platform comprising the opposite side bars, the inner one of which is converged toward the outer one at its front end, the front axle mounted in the side bars and arranged at a right angle to the inner side bar, the rear axle mounted in the rear ends of the side bars and disposed at a right angle to the outer side bar, wheels mounted on the axles, and the platform on the side bars of the cutter-bar supported upon the platform extending from the inner side thereof toward the rear, substantially as specified.

2. In a corn-harvester, the combination, with the platform comprising the outer and inner longitudinal side bars, the latter being converged at its front end toward the outer bar, the flooring connecting the two bars, the front axle carrying the wheel mounted upon the front ends of the two bars and disposed at a right angle to the inner bar, and the rear axle carrying wheels and disposed at a right angle to the outer bar and having one end extended beyond the inner bar and forming a bearing for the inner wheel, said rear axle between the inner bar and said bearing being cranked, of the cutter-bar carrying the knife at its outer edge, having its inner end loosely connected to the platform and its rear end slotted, a J-shaped bolt passed through the slot and engaging the crank on the axle, and a nut mounted upon the upper end of the bolt above the bar, substantially as specified.

3. In a corn-harvester, the combination, with the platform comprising the outer and inner longitudinal side bars, the latter being converged at its front end toward the outer bar, the flooring connecting the two bars, the front axle connecting the front ends of said bars and disposed at a right angle to the inner bar and carrying a wheel, the rear axle connecting the rear ends of said bars, disposed at a right angle to the outer bar and having its inner end extended beyond the inner bar to form a crank and at its extremity a bearing, and wheels mounted upon the bearing and at the outer end of the axle adjacent to the outer bar, of a cutter-bar adjustably connected to the platform at its front end, so as to be raised and lowered and adjustably connected to the cranked portion of said rear axle, whereby by the partial rotation of the axle the cutter-bar is adapted to be raised and lowered at its rear end, substantially as specified.

4. In a corn-harvester, the combination, with the platform and the cutter-bar supporting the knife and extending rearwardly from the platform at the front inner corner of the latter, of a bolt passed upwardly through the platform and cutter-bar, a series of space-blocks mounted upon the bolt in a removable manner, and a nut surmounting the bar and blocks, substantially as specified.

5. In a corn-harvester, the combination, with the platform, a rear cranked axle, and supporting-wheels, of a bolt passed through the platform, a cutter-bar carrying a knife perforated at its front end to receive the bolt, space-blocks perforated and mounted on the bolt, a standard pivoted to the platform and perforated to take over the bolt above the block, a nut threaded on the bolt above the standard, and means for adjustably connecting the rear end of the cutter-bar with the cranked portion of the rear axle, substantially as specified.

In testimony that I claim the foregoing as my own I have hereto affixed my signature in presence of two witnesses.

PERRY KESLING.

Witnesses:
CARRIE D. BERAU,
IDA HEPPE.